US012665868B2

(12) United States Patent
Spencer et al.

(10) Patent No.: US 12,665,868 B2
(45) Date of Patent: Jun. 23, 2026

(54) SYSTEMS AND METHODS FOR OBTAINING DATA DURING A LIVE INTERACTION

(71) Applicant: The Toronto-Dominion Bank, Toronto (CA)

(72) Inventors: Edward Spencer, Richmond Hill (CA); Jaclyn Kyung Fong, Toronto (CA); Shishir Dattatraya Bhat, Toronto (CA); Imad Jradi, London (CA); Jing Wang, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 181 days.

(21) Appl. No.: 18/471,905

(22) Filed: Sep. 21, 2023

(65) Prior Publication Data

US 2025/0106174 A1 Mar. 27, 2025

(51) Int. Cl.
| | |
|---|---|
| *G06F 15/16* | (2006.01) |
| *H04L 51/046* | (2022.01) |
| *H04L 51/18* | (2022.01) |
| *H04L 51/234* | (2022.01) |
| *H04L 51/48* | (2022.01) |

(52) U.S. Cl.
CPC ............ *H04L 51/046* (2013.01); *H04L 51/18* (2013.01); *H04L 51/234* (2022.05); *H04L 51/48* (2022.05)

(58) Field of Classification Search
CPC ..... H04L 51/046; H04L 51/48; H04L 51/234; H04L 51/18
USPC ........................................................ 709/206
See application file for complete search history.

(56) References Cited

U.S. PATENT DOCUMENTS

| | | | |
|---|---|---|---|
| 8,830,291 | B2 | 9/2014 | Kay et al. |
| 9,077,699 | B1 * | 7/2015 | James .................... H04L 51/046 |
| 10,832,310 | B2 | 11/2020 | Isaacson et al. |
| 2004/0267559 | A1 | 12/2004 | Hinderer et al. |
| 2008/0306848 | A1 | 12/2008 | Bartholomew et al. |
| 2012/0265809 | A1 | 10/2012 | Hanson et al. |
| 2013/0036023 | A1 | 2/2013 | Koplovitz |
| 2014/0129629 | A1 * | 5/2014 | Savir ........................ H04W 4/21 |
| | | | 709/204 |
| 2015/0310446 | A1 | 10/2015 | Tuchman et al. |
| 2017/0140449 | A1 * | 5/2017 | Kannan ................ G06Q 30/016 |
| 2017/0169511 | A1 | 6/2017 | Kelly |

(Continued)

FOREIGN PATENT DOCUMENTS

WO     WO2020148658 A4     7/2020

OTHER PUBLICATIONS

Sancho et al. "Authorizing Third-Party Applications Served through Messaging Platforms". Sensors 2021. Aug. 25, 2021. pp. 1-16. (Year: 2021).*

*Primary Examiner* — Imad Hussain
(74) *Attorney, Agent, or Firm* — Rowand LLP; Peter Eschlboeck

(57) ABSTRACT

Methods and computer systems for sharing data during a live interaction. Providing to a mobile device, during a live interaction between an operator associated with a terminal and a user of the mobile device, a link associated with a data sharing flow. In response to activation of the link, initiating the data sharing flow, the data sharing flow auto-prompting for identification of a third-party system storing data to be retrieved. Receiving data from an identified third-party system via the data sharing flow. Evaluating the data received and updating the terminal based on a result of the evaluation.

20 Claims, 10 Drawing Sheets

(56) References Cited

U.S. PATENT DOCUMENTS

| | | | |
|---|---|---|---|
| 2019/0141039 A1* | 5/2019 | Stoops | H04W 12/06 |
| 2020/0014642 A1 | 1/2020 | Sidi et al. | |
| 2020/0387887 A1 | 12/2020 | Rathod | |
| 2023/0206198 A1* | 6/2023 | Hecht | G06F 3/0485 |
| | | | 705/40 |
| 2023/0289879 A1* | 9/2023 | Traficante | G06Q 40/04 |

* cited by examiner

100

140

141

110

130

120

190a

191a

Third-Party System

170

190b

191b

Provider System

Third-Party System

400

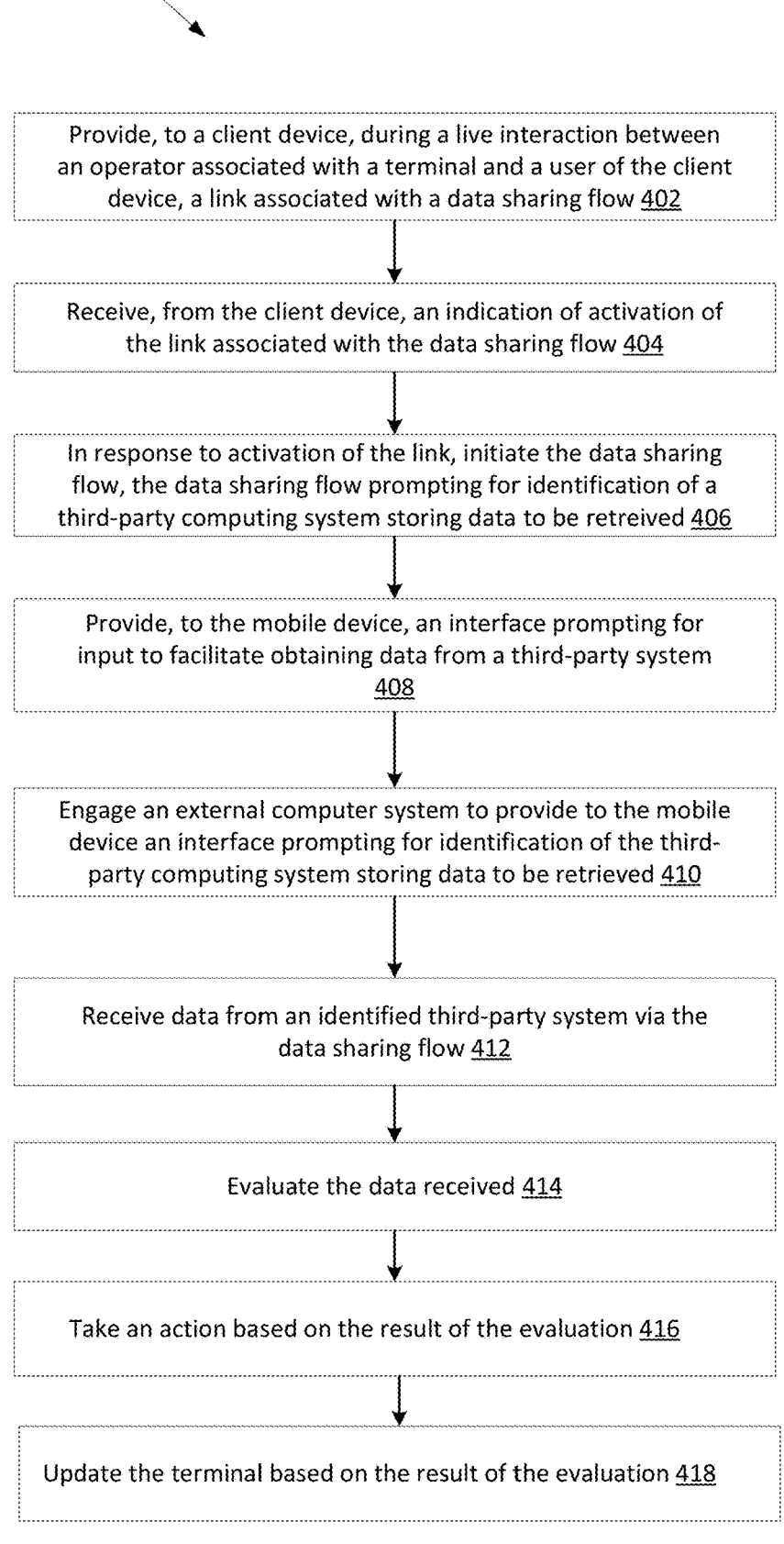

Provide, to a client device, during a live interaction between an operator associated with a terminal and a user of the client device, a link associated with a data sharing flow 402

Receive, from the client device, an indication of activation of the link associated with the data sharing flow 404

In response to activation of the link, initiate the data sharing flow, the data sharing flow prompting for identification of a third-party computing system storing data to be retreived 406

Provide, to the mobile device, an interface prompting for input to facilitate obtaining data from a third-party system 408

Engage an external computer system to provide to the mobile device an interface prompting for identification of the third-party computing system storing data to be retrieved 410

Receive data from an identified third-party system via the data sharing flow 412

Evaluate the data received 414

Take an action based on the result of the evaluation 416

Update the terminal based on the result of the evaluation 418

FIG. 4

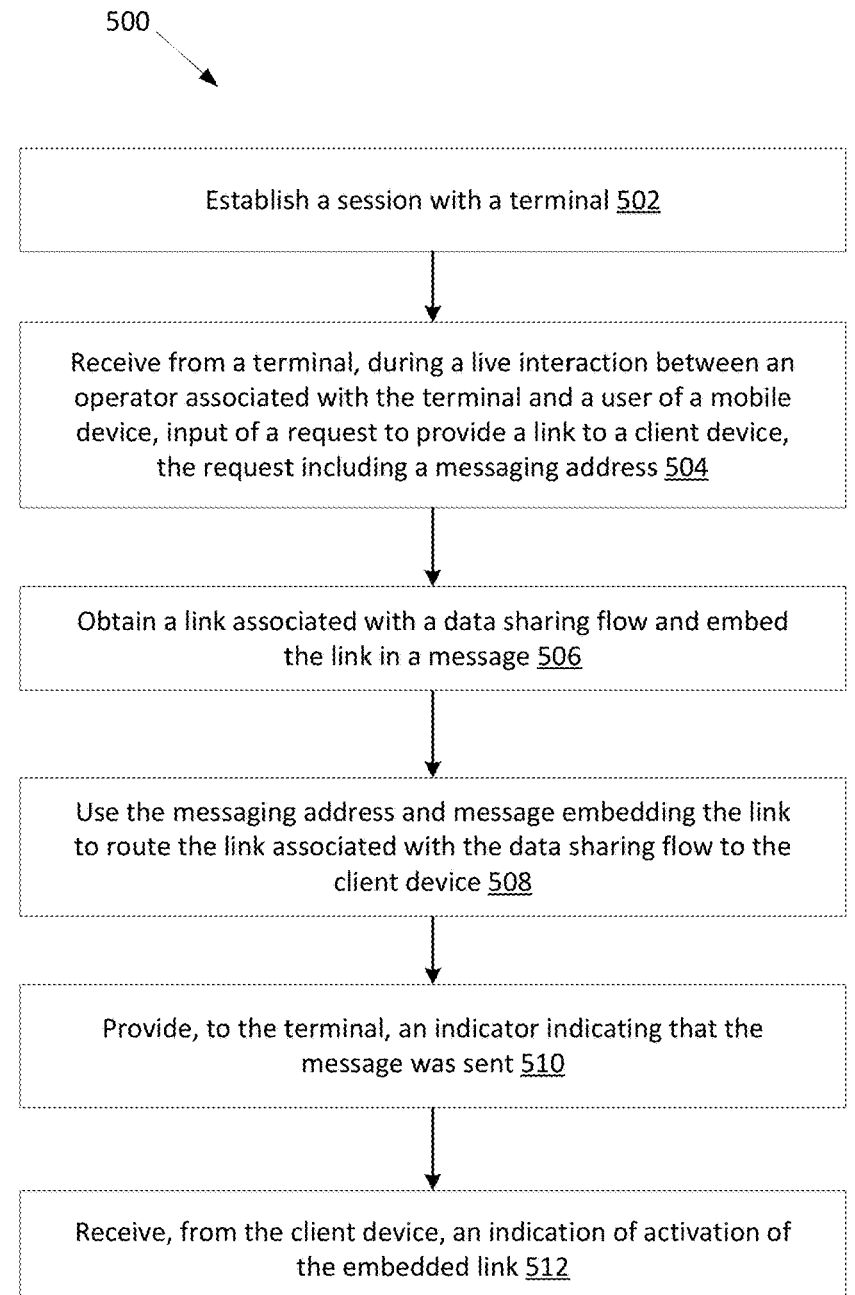

500

Establish a session with a terminal 502

Receive from a terminal, during a live interaction between an operator associated with the terminal and a user of a mobile device, input of a request to provide a link to a client device, the request including a messaging address 504

Obtain a link associated with a data sharing flow and embed the link in a message 506

Use the messaging address and message embedding the link to route the link associated with the data sharing flow to the client device 508

Provide, to the terminal, an indicator indicating that the message was sent 510

Receive, from the client device, an indication of activation of the embedded link 512

FIG. 5

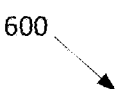

600

Receive from a terminal, during a live interaction between an operator associated with the terminal and a user of a mobile device, input of a request to provide a link associated with a data sharing flow in a machine-readable code to the terminal for display on the terminal 602

Obtain a link associated with a data sharing flow 604

Embed the link in a machine-readable code 606

Provide the link embedded in the machine-readable code to the terminal for display on the terminal 608

Receive, from the mobile device, an indication of activation of the embedded link 610

Authorization and Consent

By accepting this request, you authorize First Service Provider to access data on third-party systems:

- Account details
- Historical transaction records for the past five years

902

| Accept | Decline |

SYSTEMS AND METHODS FOR OBTAINING DATA DURING A LIVE INTERACTION

FIELD

The present disclosure relates to data sharing and, more particularly, to systems and methods for obtaining data during a live interaction.

BACKGROUND

In-person physical interactions between a customer and an employee of a service provider are common. During such interactions, the employee may gather data from the customer and then input such data into a computer system.

This traditional method of obtaining data has a number of drawbacks. For example, input of such information is time consuming and prone to human error since the employee may mishear such information or they may input the information into the system incorrectly.

Further, the traditional method of obtaining data results in delays due to the review and approval process required for such data. By way of example, proof of income documents is often provided after an initial meeting with a mortgage broker and, accordingly, a mortgage may not be approved immediately during the meeting between the mortgage broker and the customer.

It would be advantageous to provide for enhanced reliability and efficiency of obtaining data and increased usability of computer systems.

BRIEF DESCRIPTION OF THE DRAWINGS

Reference will now be made, by way of example, to the accompanying drawings which show example embodiments of the present application, and in which:

FIG. 4 shows, in flowchart form, an example method of sharing data between computer systems, according to an example embodiment;

FIG. 5 shows, in flowchart form, an example method of sharing data between computer systems, according to another example embodiment;

FIG. 6 shows, in flowchart form, an example method of sharing data between computer systems, according to yet another example embodiment;

DETAILED DESCRIPTION OF EXAMPLE EMBODIMENTS

Figure 1:
FIG. 1 shows a schematic diagram illustrating an operating environment of an example embodiment according to the subject matter of the present application.

In one embodiment, the present application describes a computer system. The computer system may include a communications module; one or more processors coupled to the communications module; and a memory coupled to the one or more processors. The memory may store instructions that, when executed by the computer system, cause the computer system to provide to a mobile device, during a live interaction between an operator associated with a terminal and a user of the mobile device, a link associated with a data sharing flow; in response to activation of the link, initiate the data sharing flow, the data sharing flow prompting for identification of a third-party system storing data to be retrieved; receive data from an identified third-party system via the data sharing flow; evaluate the data received; and update the terminal based on a result of the evaluation.

In some implementations, the instruction that, when executed by the computer system, cause the computer system to provide to the mobile device the link associated with the data sharing flow may include instructions that further cause the computer system to provide the link in a machine-readable code to the terminal for display on the terminal.

In some implementations, the instruction that, when executed by the computer system, cause the computer system to provide to the mobile device the link associated with the data sharing flow may include instructions that further cause the computer system to use a messaging address to provide the link associated with the data sharing flow to the mobile device.

In some implementations, the instructions, when executed by the computer system, may further cause the computer system to: receive, from the terminal, a messaging address; provide to a mobile device the link associated with a data sharing flow by embedding the link in a message and using the messaging address to send the message to the mobile device; and provide, to the terminal, an indicator indicating that the message was sent.

In some implementations, the instructions, when executed by the computer system, may further cause the computer system to receive, from the mobile device, an indication of activation of the link associated with the data sharing flow.

In some implementations, the instruction that, when executed by the computer system, cause the computer system to initiate the data sharing flow may include instructions that further cause the computer system to provide, to the mobile device, an interface prompting for input to facilitate obtaining data from a third-party system.

In some implementations, the instruction that, when executed by the computer system, cause the computer system to initiate the data sharing flow may include instructions that further cause the computer system to engage an external computing system to provide to the mobile device an interface prompting for identification of the third-party system storing data to be retrieved.

In some implementations, the instruction that, when executed by the computer system, cause the computer system to initiate the data sharing flow may include instructions that further cause the computer system to provide, to the mobile device, an interface prompting for identification of a profile.

In some implementations, the instruction that, when executed by the computer system, cause the computer system to evaluate the data received may include instructions that further cause the computer system to use the data received from the identified third-party system via the data sharing flow to verify data received via the terminal.

In some implementations, the instructions, when executed by the computer system, may further cause the computer system to approve a data transfer based on the data received.

In another aspect, the present application describes a computer-implemented method. The computer-implemented method may include providing to a mobile device, during a live interaction between an operator associated with a terminal and a user of the mobile device, a link associated with a data sharing flow; in response to activation of the link, initiating the data sharing flow, the data sharing flow prompting for identification of a third-party system storing data to be retrieved; receiving data from an identified third-party system via the data sharing flow; evaluating the data received; and updating the terminal based on a result of the evaluation.

In some implementations, providing to the mobile device the link associated with the data sharing flow may include providing the link in a machine-readable code to the terminal for display on the terminal and scanning by the mobile device.

In some implementations, providing to the mobile device the link associated with the data sharing flow may include using a messaging address to provide the link associated with the data sharing flow to the mobile device.

In some implementations, the method may further include: receiving, from the terminal, a messaging address; providing to a mobile device the link associated with a data sharing flow by embedding the link in a message and using the messaging address to send the message to the mobile device; and providing, to the terminal, an indicator indicating that the message was sent.

In some implementations, the method may further include receiving, from the mobile device, an indication of activation of the link associated with the data sharing flow.

In some implementations, initiating the data sharing flow may include providing, to the mobile device, an interface prompting for input to facilitate obtaining data from a third-party system.

In some implementations, initiating the data sharing flow may include engaging an external computing system to provide to the mobile device an interface prompting for identification of the third-party system storing data to be retrieved.

In some implementations, evaluating the data received may include using the data received from the identified third-party system via the data sharing flow to verify data received via the terminal.

The computer-implemented method of claim 11, wherein the link corresponds to a particular profile of a plurality of profiles.

In yet another aspect, present application describes a non-transitory computer-readable storage medium comprising processor-executable instructions which, when executed, may configure one or more processors to provide to a mobile device, during a live interaction between an operator associated with a terminal and a user of the mobile device, a link associated with a data sharing flow; in response to activation of the link, initiate the data sharing flow, the data sharing flow prompting for identification of a third-party system storing data to be retrieved; receive data from an identified third-party system via the data sharing flow; evaluate the data received; and update the terminal based on a result of the evaluation.

In yet a further aspect, the present application describes a non-transitory computer-readable storage medium storing processor-readable instructions that, when executed, configure one or more processors to perform any of the methods described herein. Also described in the present application is a computing device comprising: one or more processors, memory, and an application containing processor-executable instructions that, when executed, cause the one or more processors to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The term "real-time", "near real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 millisecond, less than 1 second, or less than 5 seconds.

Example embodiments of the present application are not limited to any particular operating system, system architecture, mobile device architecture, server architecture, or computer programming language.

FIG. 1 shows a schematic diagram illustrating an operating environment of an example embodiment. The various components cooperate to provide a computing system 100 which may be used, for example, to share data between computer systems during a live interaction between two entities. Examples of data that may be shared include profile, user, account, payment, transactional, and/or resource information. Resources may include physical assets, credits, tokenized items like non-fungible tokens, computing resources such as memory allocated or processor time, access rights, or any other resource that may be owned or credited to an account associated with an account holder. In many of the examples herein, monetary resources may be referenced to illustrate concepts, but the present application is not necessarily solely applicable to financial or monetary instruments or resources.

The operating environment in this example includes a client device 110, a terminal 120, a computing system 140, a provider system 170 and third-party systems 190. In some embodiments, the operating environment may include one or more client devices or a plurality of client devices, which may include the client device 110. The operating environment may also include one or more systems, which may include the provider system 170 and the third-party systems 190, that are external to the computing system 140.

The client device 110 may be associated with an entity, such as a user of the client device. The entity may have a plurality of logical storage areas and each particular logical storage area of the plurality of logical storage areas may be in a respective one of the data stores 141, 191*a* and/or 191*b* associated with and/or provided by the computing system 140 and/or third-party systems 190. Each particular logical storage area may also include a record that may be or represent account data or other data maintained by the associated system. The record may include data of various types and the nature of the data will depend on the nature of the associated system. By way of example, in some implementations, the record may include, for example, documents and/or other data stored by or on behalf of a user. Such documents and/or data may include, for example, any one or more of: digital identity data such as stored identity information or documentation, transactional information, photographs, text-based documents, documents prepared according to a standardized file format, such as portable document format (PDF) documents, user preferences, or other types of documents and/or data. The transactional information may include historical data transfers for the account.

The computing system 140, provider system 170 and/or third-party systems 190 may be configured to authenticate the client device 110 as being associated with one or more accounts. More particularly, the computing system 140, provider system 170 and/or third-party systems 190 may authenticate the client device 110 as being associated with account data maintained by the particular system performing the authentication. Authentication may be performed based on one or more credential such as, for example, a password, username, PIN, fingerprint, etc. In some embodiments, the user of the mobile device may have an account and/or profile with the computing system. The user may also have a respective account and/or profile with a third-party system 190.

In some embodiments, terminal 120, computing system 140, provider system 170 and/or third-party systems 190 may provide one or more front-end interfaces that allow the client device 110 to interact with the terminal 120, computing system 140, provider system 170 and/or third-party systems 190. For example, the computing system 140 may provide one or more graphical user interfaces (GUIs) to the client device 110. By way of example, the computing system 140 may provide, to the client device 110, a user interface prompting for input to facilitate obtaining data from one or more third-party systems 190.

The computing system 140, provider system 170 and third-party data systems 190 may be managed, operated, and/or controlled by one or more entities that are independent from one another. A particular entity that may be an agent of an account holder, which may be a user of the client device 110. The account holder may also be a customer (e.g. a corporate/business customer) or client of the entity or otherwise associated with the entity.

The terminal 120 and the computing system 140 may be managed, operated, and/or controlled by a same entity that may be an agent of an account holder and may be a financial institution, such as a bank.

The provider system 170 may be managed, operated, and/or controlled by an entity that is independent of the account holder, the computing system 140 and/or one or more of the third-party systems 190. In some embodiments, the provider system 170 may be referred to as an open banking provider system and the entity may referred to as an open banking provider. In some embodiments, the entity may be a vendor that handles customer flows to connect one or more financial institutions to the computing system 140. The provider system 170 may store data regarding one or more third-party systems 190. In some embodiments, the data may represent a list of third-party systems 190. In some embodiments, the provider system 170 may further include a hub that stores authorization to access data in third-party systems and stores tokens to be used by a computing system to access data on third-party systems. In some embodiments, the hub may be referred to as a data hub or open banking customer hub.

The third-party systems 190 may be managed, operated, and/or controlled by third parties that are independent of the entities that manage, operate and/or control the computing system 140 and/or provider system 170. The third-party systems 190 may be, for example, government managed, operated, or controlled external servers. In some embodiments, the third-party system 190 may be managed, operated, and/or controlled by an entity that may be an agent of the account holder and may be a financial institution, such as a bank. In many of the examples herein, financial institutions may be referenced to illustrate concepts, but the present application is not necessarily solely applicable to financial institutions.

The computing system 140 and third-party systems 190 may be or include transfer processing systems. A transfer processing system may include a transfer processing module implemented as a software module and configured to process transfers such as transfers identified in transfer messages. By way of example, a processing module or system included in the computing system 140 may be configured to perform internal transfers by transferring value between two different records in the data store 141 (i.e., between two accounts at the same financial institution) and/or to perform external transfers by interacting with one or more third-party systems 190. For example, external transfers may be performed using various transfer methods or protocols. In some implementations, at least some transfers may be performed by interacting with other financial institution systems via a SWIFT (Society for Worldwide Interbank Financial Telecommunication) network.

The computing system 140 and third-party systems 190 may further store data in respective data stores 141, 191*a* and 191*b*. The data stores 141, 191*a* and 191*b* are illustrated as single units for ease of illustration, but may include a plurality of storage units and, in some cases, storage media connected via the network 130.

As illustrated, the computing system 140 is in communication with the provider system 170, and/or third-party systems 190 via the network 130. The computing system 140 may be configured to transmit to the provider system 170 a message, for example, a transfer message. The provider system 170 may be further configured to receive a transfer message from the computing system 140. The computing system 140 may also be configured to transmit to one or more third-party systems 190 a message, for example, a request for data. The third-party systems 190 may be further configured to receive a data request from the computing system 140. The computing system 140 may also be configured to transmit to the terminal 120 a message, for example, regarding data. The terminal 120 may be further configured to receive data from the computing system 140, for example, that is obtained from a third-party system 190.

The client device 110, terminal 120, computing system 140, provider system 170 and third-party systems 190 may be configured to ingest data from each other and may transmit requests, replies, alerts, notifications, configuration objects, or other data to each other.

The computing system 140 may employ a data service provided by one or more external sources. The external source of the data service may be the provider system 170 and/or one or more of the third-party systems 190. The provider system 170 and third-party systems 190 may provide services used by the computing system 140.

The services provided by the provider system 170 and/or third-party systems 190 may be incorporated into the services provided by the computing system 140, such that when the client device 110 submits a particular request to the computing system 140, such as clicking a particular link or button on a webpage, the computing system 140 executes an application programming interface (API) call to one or more of the provider system 170 and/or third-party systems 190. The computing system 140 may then provide its service to the client device 110 through the webpages of the computing system 140.

The computing system 140 may include one or more webpages, or links or other actionable portion of webpages, that when selected execute an application programming interface call to the data service. The computing system 140 may receive data from the provider system 170 and/or third-party systems 190. The data may include any data relevant to providing the particular service, such as input data from the client device 110 that is previously stored by the third-party systems 190 or data regarding interactions with the client device 110 during a session with the third-party systems 190.

The computing system 140 may store data regarding one or more application programming interfaces. The plurality of application programming interfaces may be used by the computing system 140 to obtain data from the one or more third-party systems 190.

As illustrated, the client device 110 and terminal 120 are in communication with a computing system 140 via a network 130. In some embodiments, the client device 110 may be managed, operated or controlled by a holder of accounts with the computing system 140 and/or third-party systems 190.

The client device 110 is a computing device and may be configured to receive input. It may, as illustrated, be a smart phone. However, the client device 110 may be a computing device of another type such as, for example, a mobile device, a desktop computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The client device 110 may be used, for example, to receive user input that includes an indication of an activation of a link. The user input may further include an indication of one or more parameters associated with a data sharing request. The one or more parameters may include login information and other information to be included in or used to populate one or more fields in a data sharing request.

The terminal 120 is a computing device and may be configured to receive input. It may, as illustrated, be a desktop computer. However, the client device 110 may be a computing device of another type such as, for example, a smart phone, a desktop computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The terminal 120 may be used, for example, to receive user input from an operator of the terminal. The user input may trigger the computing system 140 to perform one or more operations.

In some embodiments, a user of the terminal may be referred to as an operator or agent and a user of the client device may be referred to as a customer.

The computing system 140, provider system 170 and third-party systems 190 are or include a computer system such as a computer server system, database management system, resource management systems, or data transfer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, web servers, email servers, file transfer protocol (FTP) servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The client device 110, terminal 120, computing system 140, provider system 170 and third-party systems 190 may be in geographically disparate locations. In at least some embodiments, the client device 110 and terminal 120 may be in the same geographic location.

The network 130 is a computer network. The network 130 may be an internetwork such as may be formed of one or more interconnected computer networks. For example, such a network may be or may include an Ethernet network, an asynchronous transfer mode (ATM) network, a wireless network, or the like. In some implementations, the network 130 may be the Internet. The network 130 allows the client device 110, terminal 120, computing system 140, provider system 170 and third-party systems 190 to communicate with one another.

As further described below, the client device 110, terminal 120, computing system 140, provider system 170 and third-party systems 190 may be configured with software to perform associated functions such as those described herein.

FIG. 1 illustrates the computing system 140, provider system 170, third-party systems 190 and data stores 141, 191*a* and 191*b* as separate and distinct computing devices. However, these systems may not all be separate physical systems. For example, the computing system 140 and the data store 141 may be implemented on a common physical device. As another example, the third-party system 190*a* and the data store 191*a* may be implemented on a common physical device. As yet another example, the computing system 140 and provider system 170 may be implemented in software associated with a common processor. As yet a further example, the data store 141 may be included in the computing system 140 or may be external to that system.

As noted above, the client device 110, terminal 120, computing system 140, provider system 170 and third-party systems 190, are or include a computer system. An example computer system 200 will now be discussed with reference to FIGS. 2 and 3. Suitably-configured instances of the example computer system 200 may, in some embodiments, serve as and/or be a part of the client device 110, terminal 120, computing system 140, provider system 170 and third-party systems 190.

Figure 2:
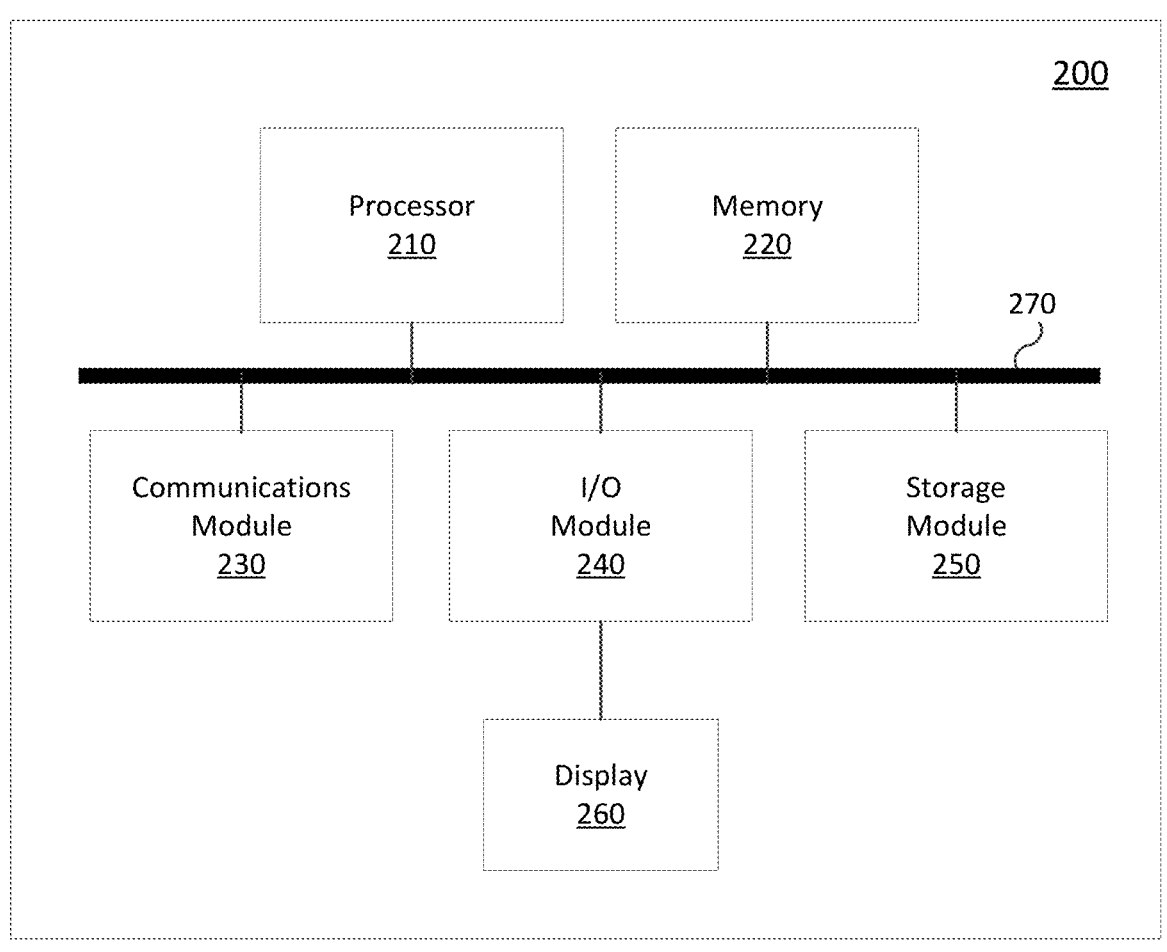
FIG. 2 shows a high-level schematic diagram of the client device, terminal, computing system, provider system and third-party systems of FIG. 1.

FIG. 2 is a high-level schematic diagram of an example computer system 200.

The example computer system 200 includes a variety of modules. For example, as illustrated, the example computing system 200 may include a processor 210, a memory 220, a communications module 230, an I/O module 240, and/or a storage module 250. As illustrated, the foregoing example modules of the example computing system 200 are in communication over a bus 270. As such, the bus 270 may be considered to couple the various modules of the client device 110 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer system 200.

The communications module 230 allows the example computer system 200 to communicate with other computing devices and/or various communications networks such as, for example, the network 130. For example, the communications module 230 may allow the example computer system 200 to send or receive communications signals. Communications signals may be sent or received according to one or more protocols or according to one or more standards. The communications module 230 may allow the example computer system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 230 may allow the example computer system 200 to communicate using near-field communication (NFC), via Wi-Fi™, using Bluetooth™ or via some combination of one or more networks or protocols. In some embodiments, all or a portion of the communications module 230 may be integrated into a component of the example computer system 200. For example, the communications module 230 may be integrated into a communications chipset.

The I/O module 240 is an input/output module. The I/O module 240 allows the client device 110 to receive input from and/or to provide input to components of the example computer system 200 such as, for example, various input modules and output modules. For example, the I/O module 240 may, as shown, allow the example computer system 200 to receive input from and/or provide output to the display 260.

The storage module 250 allows the example computer system 200 to store and retrieve data. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 230. In some embodiments, the storage module 250 may be omitted and its function may be performed by the memory 220 and/or by the processor 210 in concert with the communications module 230 such as, for example, if data is stored remotely.

The example computer system 200 may include or be connected to a display 260. The display 260 is a module of the example computer system 200. The display 260 is for presenting graphics. The display 260 may be, for example, a liquid crystal display (LCD). In addition to being an output device, the display 260 may also be an input device. For example, the display 260 may allow touch input to be provided to the example computer system 200. In other words, the display 260 may be a touch sensitive display module. In a particular example, the display 260 may be a capacitive touch screen.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
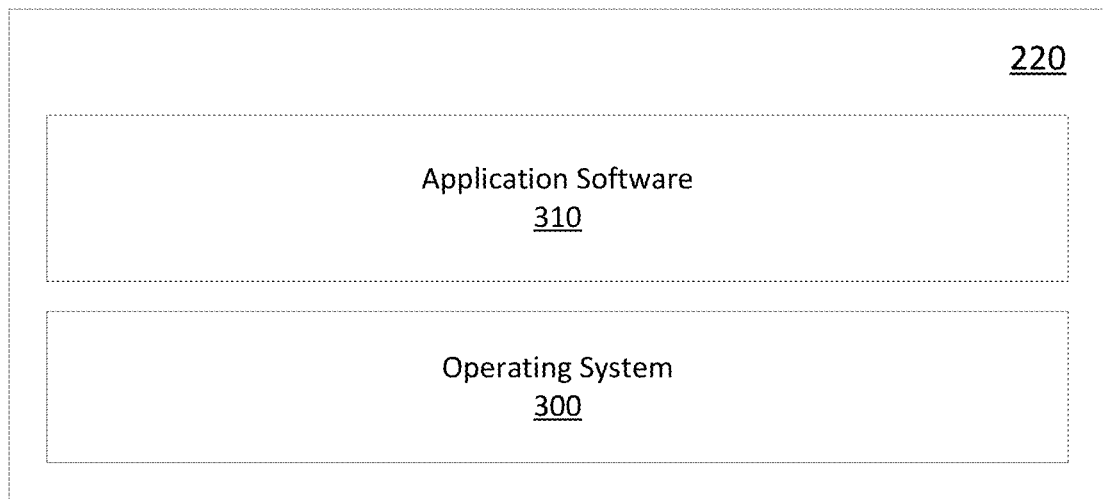
FIG. 3 shows a simplified organization of software components stored in a memory of the example computing systems of FIG. 2.

FIG. 3 depicts a simplified organization of software components stored in the memory 220 of the client device 110. As illustrated, these software components include an operating system 300 and an application software 310.

The operating system 300 is software. The operating system 300 allows the application software 310 to access the processor 210, the memory 220, the communications module 230, the I/O module 240, and the storage module 250 of the example computer system 200. The operating system 300 may be, for example, Google™ Android™, Apple™ iOS™, UNIX™, Linux™, Microsoft™ Windows™, Apple OSX™ or the like.

The application software 310, when executed, co-operates with the operating system 300 to adapt the example computer system 200 for some purpose and to provide some defined functionality. For example, the application software 310 may cooperate with the operating system 300 to adapt a suitable embodiment of the example computer system 200 to serve as the client device 110, terminal 120, computing system 140, provider system 170 and/or third-party systems 190.

Reference will now be made to FIG. 4 which illustrates an example method 400 for sharing data between computing systems during a live interaction. The operations of the example method 400 may be performed by a computer system which may be of the type described herein. In some embodiments, the operations may be performed by a computing system 140 of FIG. 1.

The computing system performing the method 400 may cooperate with other computing systems using a communications module. The communications module may be or include a hardware communications module. By way of example, the computing system 140 may communicate with one or more of a mobile client device 110, terminal 120, provider system 170, and third-party system 190 and in order to perform the method 400 or a variation thereof. One or more of the operations of the method 400 of FIG. 4 may be performed during a live interaction between an operator associated with a terminal and a user of a client device. A live interaction may, for example, be an in-person or telephone interaction.

In operation 402, the computing system provides to a mobile device, during a live interaction between an operator associated with a terminal and a user of the mobile device, a link associated with a data sharing flow.

The link may be, for example, a web address. The web address may be an address associated with a web server that is provided by or is associated with the computing system 140. The web address may be a uniform resource locator (URL). The web address may be associated with an interface. That is, the web address may be an address for a web server that serves the interface to a device that has activated the link.

The data sharing flow may include a series or sequence of graphical user interfaces (GUIs) that are provided to the mobile device by the computing system, provider system and/or third-party system for configuring access, by the computing system, to data stored on one or more third-party systems.

In operation 404, the computing system receives, from the client device, an indication of activation of the link associated with the data sharing flow. In response to receiving the indication of activation of the link, the computing system may establish an unauthenticated browsing session between the computing system and the client device. The browsing session may begin when the computing system receives the request from the client device. For example, when a user of the client device visits a website hosted on the computing system by activating the link, a browser application on the client device may generate an HTTP request to retrieve a webpage for the website. Upon receiving the request, the computing system may generate a unique session identifier and send back the requested webpage along with the session identifier.

In operation 406, in response to receiving the indication of activation of the link, the computer system initiates the data sharing flow. The data sharing flow may prompt for identification of a third-party computing system storing data to be retrieved.

In operation 408, the computing system provides, to the mobile device, one or more interfaces prompting for input to facilitate obtaining data from a third-party system. The one or more interfaces may include, for example, the authentication interface 800 of FIG. 8 and/or the consent interface 900 of FIG. 9.

In some embodiments, the computing system may determine, based on the link and/or parameters included in the link, whether the customer is a new or an existing customer and it may direct the customer to a landing page that is associated with the link. For example, if the customer is a new customer, the computing system may provide a registration interface for registering the user of the client device, whereas if the customer is an existing customer, the computing system may provide an authentication interface. The landing page may request customer input.

Figure 8:
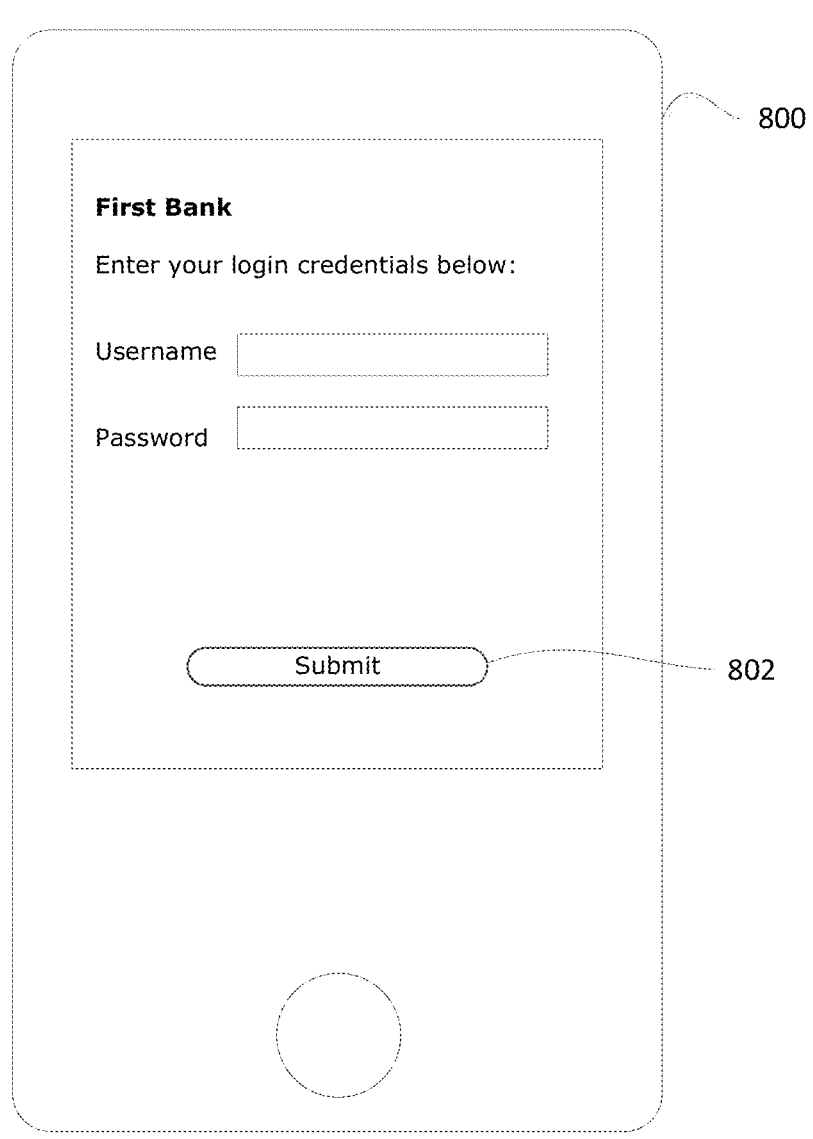
FIG. 8 is an example graphical input interface for authenticating a user of the client device.

Referring briefly to FIG. 8, shown is an authentication interface 800 for authenticating the client device. The authentication interface 800 may be displayed at the client device in a web browser upon activation of the link. The authentication interface 800 includes input areas to receive data indicating a username and password. The authentication interface 800 also includes a button for submitting the credentials to the computing system. Upon receipt of the credentials, the computing system may authenticate the user and associate the browsing session with a user account. In particular, the computing system may identify a user account based on the credentials and associate the session identifier with an account identifier associated with the identified account. The association of the browsing session with the user account may transition the unauthenticated browsing session to an authenticated browsing session. In other words, the browsing session may be transitioned from an unauthenticated state to an authenticated state. Once the browsing session is authenticated, the browsing session is provided with the authority associated with the identified account. In at least some embodiments, the account may include a profile for the customer, which may include, for example, the name and address of the customer.

In some embodiments, the authentication interface 800 may be modified to include interface elements for launching a registration process for the registration of new users that do not yet have credentials for logging into the computing system. In this way, both existing and new customers may authenticate with the computing system.

Upon authentication the user of the client device, the computing system may provide a consent interface 900 for obtaining consent from the user to share data stored by third-party systems with the computing device.

Figure 9:
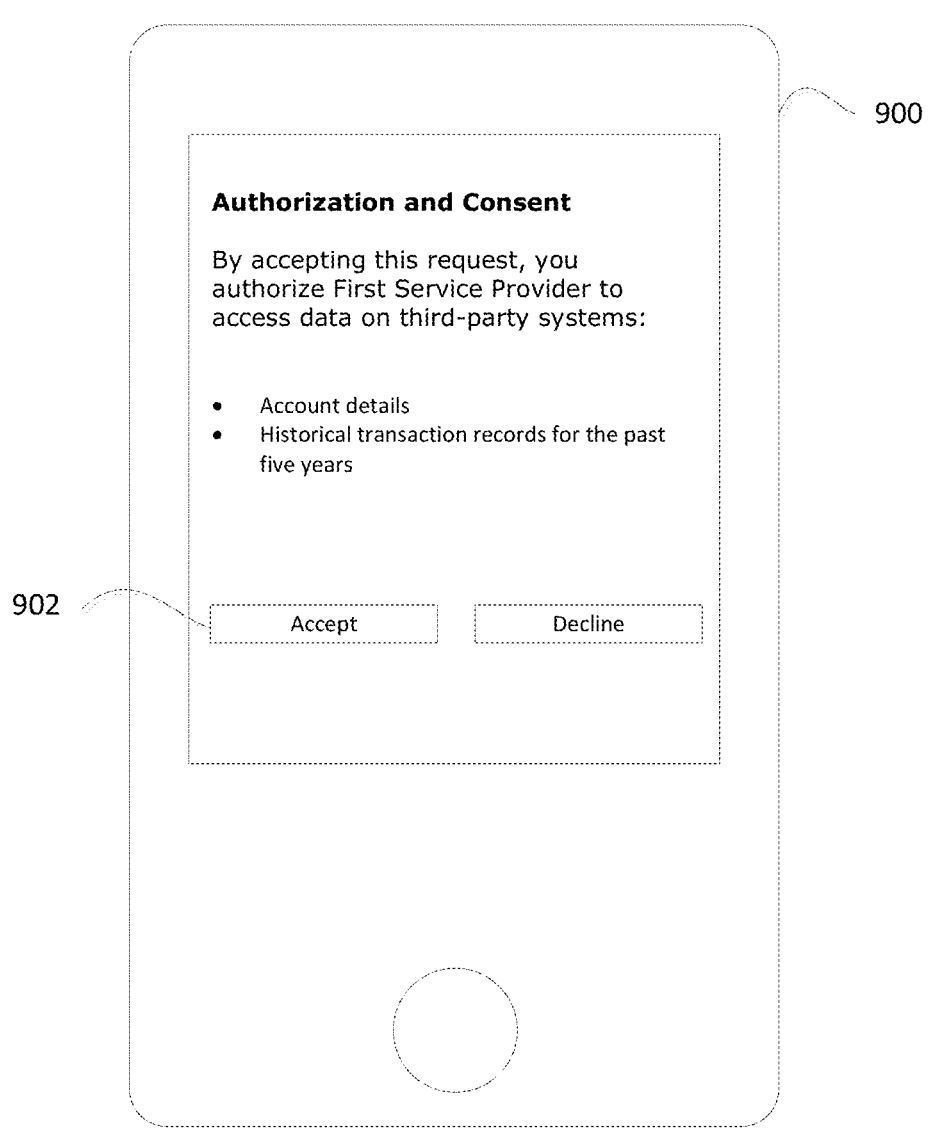
FIG. 9 is an example graphical input interface for providing consent to share data.

Referring briefly to FIG. 9, an example consent interface 900 is illustrated. The consent interface 900 may be displayed at the client device in a web browser upon authentication of the user of the client device. The authentication interface prompts the user to provide their consent and includes a selectable option 902 that may be activated to trigger the client device to transmit to the computing system user input indicating that the user consents.

Referring back to FIG. 4, in response to receiving the user input indicating consent, in operation 410, the computing system may automatically in real-time engage an external computer system to provide to the mobile client device an interface prompting for identification of the third-party computing system storing the data to be retrieved. The external computer system may be, for example, the provider system 170 shown in FIG. 1.

Figure 10:
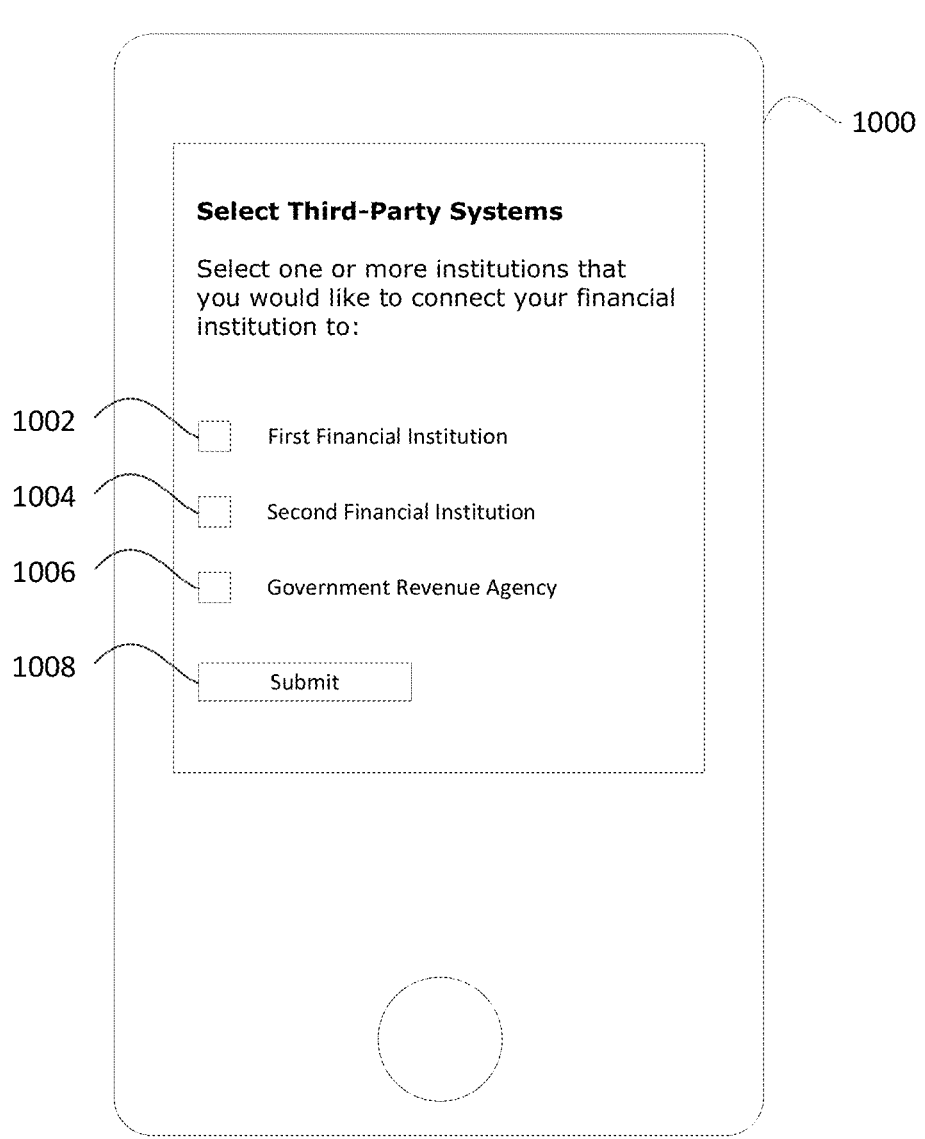
FIG. 10 is an example graphical input interface for selecting one or more third-party systems storing data associated with a user of the client device.

Referring to FIG. 10, shown is an example system selection interface 1000 for selecting a third-party system. In some embodiments, the user interface may provide one or more user selectable options for selecting one or more third-party systems. The example system selection interface 1000 includes a first option 1002 for selecting a system corresponding to a first financial institution, a second option 1004 for selecting a system corresponding to a second financial institution, and a third option 1006 for selecting a system corresponding to a government revenue agency. The first, second and/or third options may be presented as a link, button or other actionable user interface element and may include text.

The interface 1000 includes a selectable option 1002 that may be activated to trigger the client device to submit the selected or identified third-party systems to the external computer system. The external computer system may engage the selected one or more third-party systems to provide the mobile client device with corresponding interfaces prompting for authentication with the third-party systems and authorization of the third-party system to share data with the computing system. In at least some embodiments, the authorization provided to the third-party systems should be consistent with the consent indicated by the customer to the computing system in the consent interface.

In response to engaging the external computer system, the computing system may receive from the provider system and/or data hub one or more tokens for accessing data on the third-party systems. The one or more tokens and an application programming interface may be used to unlock access to data stored on the one or more third-party systems.

Referring back to FIG. 4, in operation 412, the computing system receives data from an identified third-party system via the data sharing flow. Receiving the data may involve identifying an application programming interface capable of downloading data from a third-party system. In some embodiments, the application programming interface is provided by the provider system or the data hub.

In some embodiments, each third-party system may provide a respective application programming interface. The computing system may receive data by identifying, from amongst a plurality of application programming interfaces, an application programming interface capable of download data and using the identified application programming interface to download data from the identified third-party system. The identification of the application programming interface may be based on the particular third-party system.

In some embodiments, the identified application programming interface may utilize a particular messaging protocol (e.g., a Representation State Transfer (REST) API (RESTful API) or a Simple Object Access Protocol (SOAP) API). Using the application programming interface may include generating a message in conformity with the particular messaging protocol for invoking the identified application programming interface.

The computing system may use the identified application programming interface, as well as an identifier of the identified third-party system, to download data from the third-party system. In some cases, the identifier may include a domain name corresponding to the third-party system.

In some embodiments, the computer system uses the identified application programming interface to query the identified third-party system to retrieve data corresponding to the consent provided by the user via a consent interface. For example, the data may include account information associated with the user and stored by the identified third-party system.

In operation 414, the computing system evaluates the data received. In some embodiments, the received data may be referred to as open banking data.

In some embodiments, the received data is used to verify data received from the terminal prior to the activation of the link. The data received from the terminal and the data received from the third-party system may be, for example, identification (e.g. first and last name) and/or contact information (e.g. a street address) for the customer. The data from the terminal and third-party system may be compared and, in this way, the computing system may detect errors in data entered by the operator.

In some embodiments, computer system may approve a data transfer based on the data received. For example, the data received may be a credit score associated with the customer. The received credit score may be compared to a threshold credit score. Based on the comparison, the computing system may approve a data transfer to an account held by the customer. The data transfer may transfer financial resources, such as a monetary amount, to the account.

In some embodiments, the received data may be income data obtained directly from a financial institution that receives the customer's pay. The income data may be evaluated to, for example, adjudicate a mortgage application.

In operation 416, the computing system may take, in real-time, one or more actions based on the received data and/or the result of the evaluation.

For example, the computing system may convert the received data and/or the result of the evaluation to another form. In some embodiments, the computing system may generate a document in PDF based on the received data and/or result of the evaluation.

By way of another example, the computing system may generate a notification based on the result of the evaluation. The generated notification may include one or more parameters. Example parameters include the data received from the identified third-party system, the converted data, and/or the result of the evaluation. The notification, which may include a generated document, may be transmitted to the terminal and/or the client device.

In operation 418, the computing system updates the terminal based on the result of the evaluation. In some embodiments, updating the terminal includes transmitting, to the terminal, the notification and/or generated document for display by the terminal. Information included in the link and transmitted to the computing system may be used to identify the terminal in cases where the terminal is one of a plurality of terminals connected to the computing system. For example, the link may include a terminal identifier that may be used to update the terminal.

Figure 11:
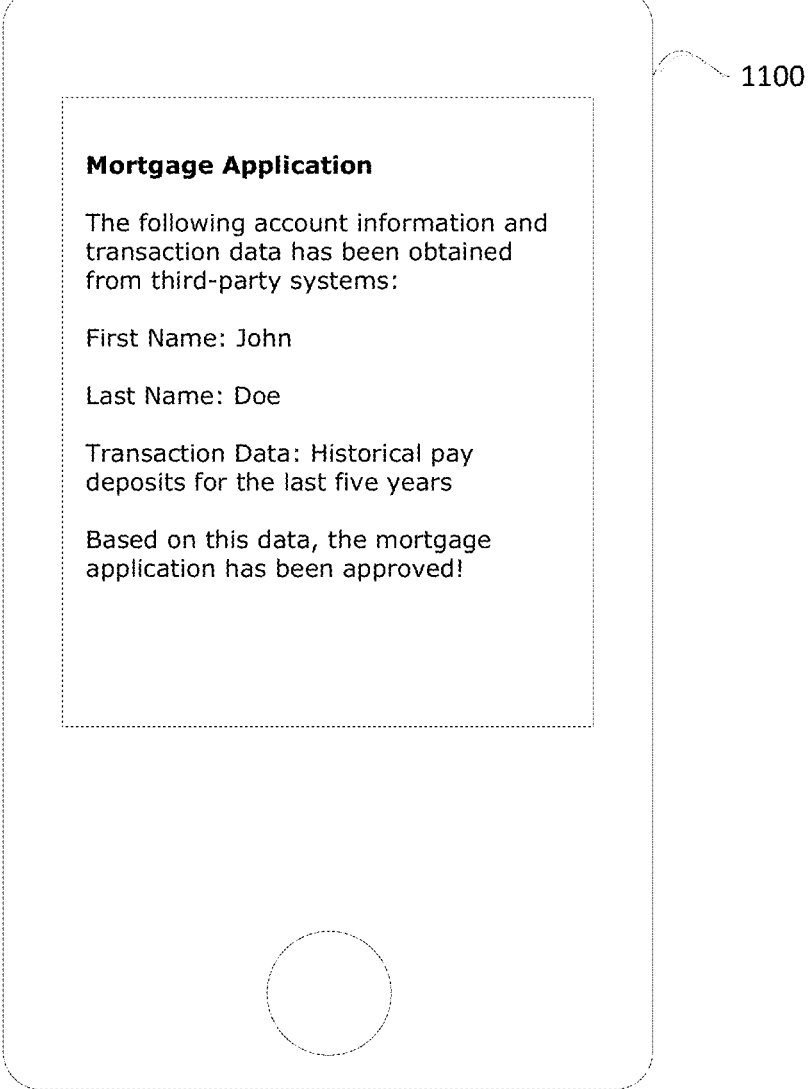
FIG. 11 is an example graphical input terminal interface. Similar reference numerals may have been used in different figures to denote similar components.

Referring briefly to FIG. 11, an example terminal interface 1100 is illustrated. The terminal interface 1100 may be displayed at the terminal in a web browser based on the result of the evaluation. As shown, the terminal interface 1100 includes example data received from a third-party financial institution and the result of the evaluation of the shared data.

In this way, the computing systems described herein may offer a number of advantages over traditional techniques. For example, data entry error may be avoided. Similarly, communication errors between the customer and the operator may be avoided. Further, in some embodiments, by obtaining data using open banking techniques while the customer remains engaged with the operator, such data may be used and evaluated in real-time while the customer remains engaged with the operator. For example, in some instances, the operator's computer terminal may be updated to display an indication of whether or not a mortgage or other product is approved.

The method 400 of FIG. 4 may be varied, for example, as illustrated in the method 500 of FIG. 5 and the method 600 of FIG. 6.

Reference will now be made to FIG. 5 which illustrates an example method 500 for providing a recommendation of an action to be performed in connection with a set of computing events. The operations of the example method 500 may be performed by a computer system which may be of the type described herein and may be performed during a live interaction. In some embodiments, the operations may be performed by a computing system 140 of FIG. 1. It will be appreciated that one or more operations of the method 500 may correspond to or implement one or more operations of the method 400 of FIG. 4.

In operation 502, the computing system establishes a session with a terminal. During the session, the operator of the terminal may input credentials associated with the operator that are transmitted to the computing system and authenticated by the computing system to authenticate the session. The operation may also input via the terminal basic information about a customer. This information may include, for example, a messaging address.

In operation 504, the computing system receives from the terminal, during a live interaction between an operator associated with the terminal and a user of a mobile device, input. The input may include a messaging address and/or a request to provide a link associated with a data sharing flow to a client device. The input may be received during the session established with the terminal.

In some embodiments, operations performed by the computing system may be triggered by the user input received via the terminal. Examples of trigger events include user input received, via an actionable user interface element, for causing a link associated with a data sharing flow to be sent to the client device.

In some embodiments, the input may be used to identify a profile and/or account associated with the user of the mobile device and to associate the terminal session with the account. For example, input may include a messaging address, a customer identifier, profile identifier, or account identifier that corresponds to a profile and/or user account maintained by the computing system.

Upon receiving the input from the terminal, the computing system may, in real-time, engage the client device. Engaging the client device may involve embedding a link in a message and transmitting the link to the client device. In this way, in some embodiments, the computing system may send an email message to the client device in real-time in response to receiving the messaging address.

In operation 506, the computing system generates or obtains a link associated with a data sharing flow and embeds the link in a message.

Generating a link may include encoding data as parameters, such as URL parameters, for the URL. An example of data that may be included in the link is data that is received from the terminal. Another example is data identifying the identified profile or account associated with the user of the client device, such as a customer identifier, a user identifier of the user of the client device. The link may be unique for each customer by including, for example, the customer identifier. Other examples include data identifying the session established with the terminal, a terminal identifier identifying the terminal, and/or a transaction identifier. In this way, when a customer receives and activates the link via the client device, the client device may be directed to the web address associated with the computing system and may pass the web address such data as parameters.

In some embodiments, the computing system may also associate the terminal session with the link or data included in the link.

In operation 508, the computing system may use the messaging address to route the link associated with the data sharing flow to the client device. In some embodiments, the messaging address may be obtained from the user account identified based on the input received from the terminal.

The transmission of the notification may be performed in accordance with any suitable means of communication. In some embodiments, the communication may be implemented using a messaging paradigm, such as email, text message, instant message, automated telephone call, or messaging to an application relating to the identified account. Information of the identified user account may be used to transmit the notification to the client device. In some embodiments, the computing system may transmit the notification to the client device using a messaging address, for example, an email address and/or a telephone number, associated with the identified account or received as input via the terminal.

The notification may be provided in different forms and the message of the notification may vary. The notification may include information of the matched user account, such as the account identifier. The notification may also include the generated link. In some embodiments, the message may be a rich Hypertext Transfer Protocol (HTTP) email, pure text email or short messaging service (SMS) message.

The identified user account may be associated with the client device. For instance, the client device may be configured with information of the identified user account in order to receive notifications from the computing system. In some embodiments, the client device may include an email application that is configured to receive emails addressed to an email address of the identified account. The client device may also be configured to receive text messages and telephone calls at a telephone number of the identified account. In some embodiments, the client device may be configured to receive a notification via an application that relates to the identified account and is installed on the client device. The application may be, for example, a financial application that is configured with credentials (e.g. a username and password) of the identified account for authenticating the application with the computing system. The computing system may transmit the notification to the authenticated financial application.

The client device may present the notification to a user of the client device via a user interface. The user interface may be that of a messaging application, such as an email application, text and/or voice message application, instant message application, or an application relating to the matched account. In some embodiments, the user interface may be a graphical user interface that presents the notification via pop-up, alert, or in any other suitable manner. The notification may prompt for input selecting the link. The link embedded in the notification may be presented as a link, button or other actionable user interface element and may include text.

The notification may be actionable, such as through the link embedded in the notification, which may be selectable to either directly indicate a user selection and to navigate to a website, webpage, application interface, or other user interface through which the user is prompted to provide input for a data sharing flow. The notification may prompt for user input confirming the initiation of the data sharing flow. The client device may receive user input in response.

Figure 7:
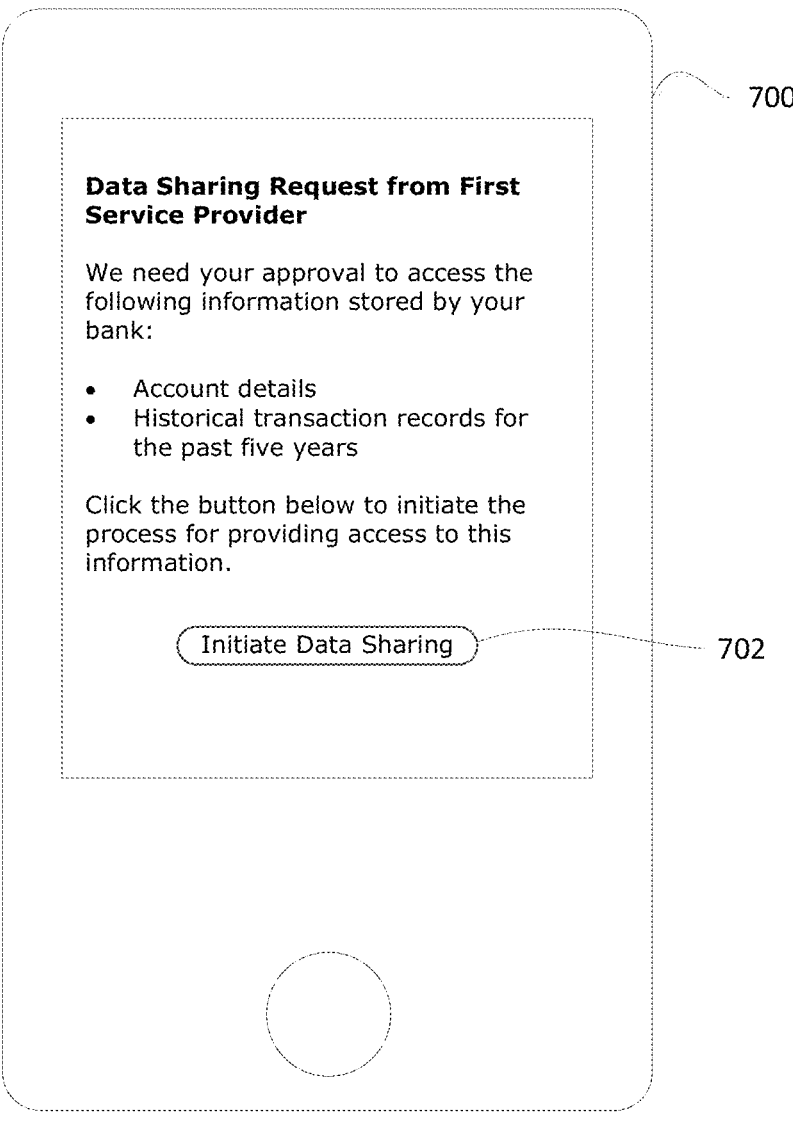
FIG. 7 is an example graphical input interface including a link for initiating a data sharing flow.

Referring briefly to FIG. 7, an example notification input interface 700 is illustrated. The notification interface 700 may include a message that is provided by the notification or is generated based on the notification. The notification interface 700 also includes a selectable option 702. The selectable option 702 may be activated in order to trigger the computing system to process the request to initiate a data sharing flow. The selectable option 802 may be associated with a reference or uniform resource identifier (URI) that links to the computing system. The selectable option 702 may be a link for launching a user interface provided by the computing system. For example, the selectable option 702 may be invoked to launch an authentication interface for accepting user authentication.

In operation 510, responsive to transmitting the notification to the client device, the computing system provides, to the terminal, in real-time or near real-time, an indicator indicating that the notification message was sent to the client device. The notification may be displayed on a display of the terminal.

In operation 512, the computing system receives, from the client device, an indication of activation of the link associated with the data sharing flow. The operation 512 may correspond to the operation 406 of the method 400 of FIG. 4 and the method 500 may continue from the operation 406 of the method 400 as shown in FIG. 4 and perform one or more operations 408, 410, and/or 412 of the method 400 of FIG. 4.

In operation 514, the computing system updates, during the session, the terminal based on the result of an evaluation of data received from an identified third-party system via the data sharing flow. The operation 514 may correspond to operation 414 of the method 400 of FIG. 4.

Reference will now be made to FIG. 6 which illustrates an example method 600 for providing a recommendation of an action to be performed in connection with a set of computing events. The operations of the example method 600 may be performed by a computer system which may be of the type described herein. In some embodiments, the operations may be performed by a computing system 140 of FIG. 1. It will be appreciated that one or more operations of the method 600 may correspond to or implement one or more operations of the method 400 of FIG. 4 and/or the method 500 of FIG. 5.

In operation 602, the computing system receives from a terminal, during a live interaction between an operator associated with the terminal and a user of a mobile device, a request message. The request message may include an indication to provide a link associated with a data sharing flow in a machine-readable code to the terminal for display on the terminal.

One or more operations 604, 606 and/or 608 of the method 600 of FIG. 6 may be responsive to or triggered by receiving such a request. For example, in operation 604, responsive to receiving the request, the computing system obtains a link associated with a data sharing flow.

In operation 606, the computing system embeds the link in a machine-readable code. The machine-readable code may, in some implementations, be a quick response (QR) code. The machine-readable code may encode various data. For example, the machine-readable code may encode the link. The machine-readable code may also encode a customer identifier, session identifier, terminal identifier and/or transaction identifier.

The link may be, for example, a web address. The web address is an address associated with a web server that is provided by or is associated with the computing system 140. The web address may be a uniform resource locator (URL). The web address may be associated with an interface. That is, the web address may be an address for a web server included in the computing system that serves the interface to a device that has scanned the machine-readable code.

The machine-readable code may encode security or verification data. For example, the machine-readable code may encode a hash. The computing system 140 may generate the hash based on other data encoded in the machine-readable code. For example, the hash may be generated based on any one or a combination of: the link/web address, customer identifier, session identifier, terminal identifier and/or transaction identifier.

The machine-readable code may be digitally signed by the computing system 140 and/or may encode a digital signature.

In some implementations, at least some of the data that is encoded in the machine-readable code may be encoded as parameters associated with the web address that is encoded in the machine-readable code. For example, any one or a combination of: the hash, the customer identifier, the session identifier, the terminal identifier, the transaction identifier and/or the digital signature may be encoded as parameters, such as URL parameters, for the URL. In this way, when a customer scans the machine-readable code with a client device 110, the customer device 150 may be directed to the web address associated with the computing system 100 and may pass the web address such data as parameters.

In operation 608, the computing system may, after preparing the machine-readable code, send a message to the terminal. The terminal may include the machine-readable code. In sending the machine-readable code to the terminal, the computing system 140 may cause the machine-readable code to be displayed at the terminal. The terminal receives the message and, in doing so, receives the machine-readable code. The terminal may display the machine-readable code at a display module associated with or included in the terminal.

The operator of the terminal may then ask a customer to scan or read the machine-readable code using a client device 110.

In operation 610, the computing system receives, from the mobile device, an indication of activation of the link associated with the data sharing flow. The operation 610 may correspond to the operation 406 of the method 400 of FIG. 4 and the method 500 may continue from the operation 406 of the method 400 as shown in FIG. 4 and perform one or more operations 408, 410, and/or 414 of the method 400 of FIG. 4.

It will be appreciated that the method 600 of FIG. 6 may be varied to include one or more operations of the method 500 of FIG. 5. In particular, persons ordinarily skilled in the art will appreciate that in some embodiments the method 600 may be varied to include operations 502 and 514 of the method 500 of FIG. 5 in order to perform the method 600 during a terminal session and associate the session to the user of the mobile device and/or to the data sharing flow.

It will be appreciated that the techniques described herein may be used with numerous advisor led tools. For example, such techniques may be used with account funding, which occurs when a customer is transferring a portion of an account balance from one institution to another. The computing system may, for example, use open banking techniques during the live interaction to share account information for an account from which a transfer is to be made. By way of further example, such techniques may be used for auto-finance use cases.

In another example, the techniques described herein may be used in a financial advisor scenario. In such a scenario, the open data may be analyzed by the computing system while the customer remains with the advisor and the advisor's terminal may then be updated so that the advisor may provide appropriate advice based on the analysis. For example, it may be that the computing system may in real-time evaluate a customer's spending so that the advisor may make a recommendation, or it may be that the computing system may in real-time evaluate the customer's investment portfolio so that the advisor may make an appropriate recommendation (e.g., "you appear to be overly exposed to equities", etc.).

Further, it will be appreciated that data may be obtained from other third-party systems apart from financial institution systems using the open banking techniques or, more generally, open finance techniques described above. For example, it may be that, after the customer activates the link, the computing system obtains data from a payroll provider system or tax system.

It will be appreciated that it may be that some or all of the above-described operations of the various above-described example methods may be performed in orders other than those illustrated and/or may be performed concurrently without varying the overall operation of those methods.

It will also be appreciated that some or all of the above-described operations of the various above-described example methods may be triggered by, or caused by, or performed in response to, one or more of the above-described operations, and may be performed in real-time.

It will also be appreciated that some or all of the above-described operations of the various above-described example methods may be performed in real-time or near real-time in response to one or more of the above-described operations.

Some of the embodiments described herein focus on financial systems. However, it is understood that the present application is not limited to any such embodiments and that the embodiments described with respect to a particular type of transfer generally may be extended to other types of systems.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A computer system comprising:
a communications module;
one or more processors coupled to the communications module; and
a memory coupled to the one or more processors and storing instructions that, when executed by the computer system, cause the computer system to:
during a live interaction between an operator associated with a terminal and a user of a separate mobile device:
receive, from the terminal, input indicating a messaging address; and
use the messaging address received from the terminal to send to the separate mobile device a link associated with a data sharing flow for sharing data from a separate third-party system with the computer system;
in response to activation of the link, initiate the data sharing flow, the data sharing flow establishing an authenticated session and upon establishing the authenticated session prompting for identification of the separate third-party system storing data to be retrieved;
receive data from an identified third-party system via the data sharing flow;
evaluate the data received; and
update the terminal based on a result of the evaluation.

2. The computer system of claim 1, wherein the instructions that cause the computer system to provide to the mobile device the link associated with the data sharing flow further cause the computer system to provide the link in a machine-readable code to the terminal for display on the terminal.

3. The computer system of claim 1, wherein the instructions, when executed by the computer system, further cause the computer system to receive, from the mobile device, an indication of activation of the link associated with the data sharing flow.

4. The computer system of claim 1, wherein the instructions that cause the computer system to initiate the data sharing flow further cause the computer system to provide, to the mobile device, an interface prompting for input to facilitate obtaining data from the third-party system.

5. The computer system of claim 1, wherein the instructions that cause the computer system to initiate the data sharing flow further cause the computer system to engage an external computing system to provide to the mobile device an interface auto-prompting for identification of the third-party system storing data to be retrieved.

6. The computer system of claim 1, wherein the instructions that cause the computer system to initiate the data sharing flow further cause the computer system to provide, to the mobile device, an interface prompting for identification of a profile.

7. The computer system of claim 1, wherein the instructions that cause the computer system to evaluate the data received further cause the computer system to use the data received from the identified third-party system via the data sharing flow to verify data received via the terminal.

8. The computer system of claim 1, wherein the instructions, when executed by the computer system, further cause the computer system to approve a data transfer based on the data received.

9. The computer system of claim 1, wherein the input received from the terminal further includes a customer identifier.

10. The computer system of claim 1, wherein the link is a unique link generated by the computer system during the live interaction.

11. A computer-implemented method comprising:
during a live interaction between an operator associated with a terminal and a user of a separate mobile device:
receiving, from the terminal, input indicating a messaging address; and
using the messaging address received from the terminal to send to the separate mobile device a link associated with a data sharing flow for sharing data from a separate third-party system with a computer system;
in response to activation of the link, initiating the data sharing flow, the data sharing flow establishing an authenticated session and upon establishing the authenticated session prompting for identification of the separate third-party system storing data to be retrieved;

receiving data from an identified third-party system via the data sharing flow;

evaluating the data received; and updating the terminal based on a result of the evaluation.

12. The computer-implemented method of claim 11, wherein providing to the mobile device the link associated with the data sharing flow includes providing the link in a machine-readable code to the terminal for display on the terminal and scanning by the mobile device.

13. The computer-implemented method of claim 11, further comprising receiving, from the mobile device, an indication of activation of the link associated with the data sharing flow.

14. The computer-implemented method of claim 11, wherein initiating the data sharing flow includes providing, to the mobile device, an interface prompting for input to facilitate obtaining data from the third-party system.

15. The computer-implemented method of claim 11, wherein initiating the data sharing flow includes engaging an external computing system to provide to the mobile device an interface prompting for identification of the third-party system storing data to be retrieved.

16. The computer-implemented method of claim 11, wherein evaluating the data received includes using the data received from the identified third-party system via the data sharing flow to verify data received via the terminal.

17. The computer-implemented method of claim 11, wherein the link corresponds to a particular profile of a plurality of profiles.

18. The computer-implemented method of claim 11, wherein the input received from the terminal further includes a customer identifier.

19. The computer-implemented method of claim 11, wherein the link is a unique link generated by the computer system during the live interaction.

20. A non-transitory computer-readable storage medium comprising processor-executable instructions which, when executed, configure one or more processors to:

during a live interaction between an operator associated with a terminal and a user of a separate mobile device:

receive, from the terminal, input indicating a messaging address; and use the messaging address received from the terminal to send to the separate mobile device a link associated with a data sharing flow for sharing data from a separate third-party system with a computer system;

in response to activation of the link, initiate the data sharing flow, the data sharing flow establishing an authenticated session and upon establishing the authenticated session prompting for identification of the separate third-party system storing data to be retrieved;

receive data from an identified third-party system via the data sharing flow;

evaluate the data received; and update the terminal based on a result of the evaluation.

* * * * *